US010122776B2

(12) United States Patent
Feher et al.

(10) Patent No.: US 10,122,776 B2
(45) Date of Patent: *Nov. 6, 2018

(54) BIDIRECTIONAL COMMUNICATION ON LIVE MULTIMEDIA BROADCASTS

(71) Applicant: Ustream, Inc., San Francisco, CA (US)

(72) Inventors: Gyula Feher, Budapest (HU); Zsolt Biro, Budapest (HU); Gabor Nyerges, Veresegyhaza (HU); Gabor Farkas, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/879,956

(22) Filed: Oct. 9, 2015

(65) Prior Publication Data
US 2016/0036876 A1    Feb. 4, 2016

Related U.S. Application Data

(63) Continuation of application No. 13/592,171, filed on Aug. 22, 2012, now Pat. No. 9,185,152.
(Continued)

(51) Int. Cl.
*G06F 15/16* (2006.01)
*H04L 29/06* (2006.01)
(Continued)

(52) U.S. Cl.
CPC ........ *H04L 65/4076* (2013.01); *H04L 43/103* (2013.01); *H04L 65/1069* (2013.01);
(Continued)

(58) Field of Classification Search
CPC . H04L 65/4076; H04L 65/4084; H04L 65/80; H04L 65/1069; H04L 67/306; H04L 29/06027; H04B 7/00
(Continued)

(56) References Cited

U.S. PATENT DOCUMENTS

| 5,664,006 A * | 9/1997 | Monte ............... H04B 7/18539 |
| | | 370/320 |
| 6,172,673 B1 * | 1/2001 | Lehtinen ............... H04H 20/40 |
| | | 348/E7.081 |

(Continued)

OTHER PUBLICATIONS

United States Office Action, U.S. Appl. No. 13/592,171, dated May 21, 2015, 15 pages.
(Continued)

*Primary Examiner* — Melvin H Pollack
(74) *Attorney, Agent, or Firm* — Schmeiser, Olsen & Watts, LLP; Jay Wahlquist

(57) ABSTRACT

A bidirectional connection between a multimedia stream distribution system and a user is used to communicate operational data to and from the user. The bidirectional connection is separate from a multimedia connection that transfers a multimedia stream from the multimedia stream distribution system to the user. Providing a bidirectional connection separate from the multimedia connection is advantageous, among other reasons, because the operational data can be collected effectively at the multimedia stream distribution system independent of any limitations in the multimedia connection. To organize users and reduce processing load, the multimedia stream distribution system assigns users to user groups based on shared characteristics. Groups may be used to propagate information to the users as well as analyze information collected from the users in an efficient manner.

20 Claims, 6 Drawing Sheets

Related U.S. Application Data

(60) Provisional application No. 61/527,480, filed on Aug. 25, 2011, provisional application No. 61/570,763, filed on Dec. 14, 2011.

(51) Int. Cl.
 *H04L 29/08* (2006.01)
 *H04L 12/26* (2006.01)

(52) U.S. Cl.
 CPC .......... *H04L 65/4084* (2013.01); *H04L 65/80* (2013.01); *H04L 67/306* (2013.01); *H04L 29/06027* (2013.01)

(58) Field of Classification Search
 USPC .......................... 709/246; 707/692; 370/328
 See application file for complete search history.

(56) References Cited

U.S. PATENT DOCUMENTS

| | | | |
|---|---|---|---|
| 6,307,550 B1 | 10/2001 | Chen et al. | |
| 6,334,127 B1 * | 12/2001 | Bieganski | G06F 17/30867 |
| 6,378,132 B1 | 4/2002 | Grandin et al. | |
| 6,546,555 B1 | 4/2003 | Hjelsvold et al. | |
| 6,564,380 B1 | 5/2003 | Murphy | |
| 6,614,729 B2 | 9/2003 | Griner et al. | |
| 6,631,522 B1 | 10/2003 | Erdelyi | |
| 6,760,916 B2 | 7/2004 | Holtz et al. | |
| 6,774,926 B1 | 8/2004 | Ellis et al. | |
| 6,795,638 B1 | 9/2004 | Skelley, Jr. | |
| 6,810,397 B1 | 10/2004 | Qian et al. | |
| 6,877,010 B2 | 4/2005 | Smith-Semedo et al. | |
| 6,882,793 B1 | 4/2005 | Fu et al. | |
| 7,035,653 B2 | 4/2006 | Simon et al. | |
| 7,076,552 B2 * | 7/2006 | Mandato | H04L 12/5695 370/239 |
| 7,263,481 B2 | 8/2007 | Jabri et al. | |
| 7,340,765 B2 | 3/2008 | Feldmeier | |
| 7,363,218 B2 | 4/2008 | Jabri et al. | |
| 7,428,422 B2 | 9/2008 | Hannu et al. | |
| 7,607,403 B2 | 10/2009 | Walters | |
| 7,610,358 B2 | 10/2009 | Benschoter et al. | |
| 7,800,646 B2 | 9/2010 | Martin | |
| 7,876,352 B2 | 1/2011 | Martin | |
| 7,885,993 B2 | 2/2011 | Kondo et al. | |
| 8,035,752 B2 | 10/2011 | Castle et al. | |
| 8,117,546 B2 | 2/2012 | Chang | |
| 8,154,580 B2 | 4/2012 | Sim et al. | |
| 8,255,552 B2 * | 8/2012 | Witt | G06F 17/30017 709/204 |
| 8,442,922 B2 | 5/2013 | Martin | |
| 8,458,099 B2 | 6/2013 | Shear et al. | |
| 8,560,729 B2 * | 10/2013 | Jabri | H04L 65/605 370/352 |
| 8,620,878 B2 | 12/2013 | Feher et al. | |
| 8,743,294 B2 * | 6/2014 | Fan | G07C 9/00031 348/734 |
| 8,819,134 B2 | 8/2014 | Ham et al. | |
| 8,856,826 B2 | 10/2014 | Benschoter et al. | |
| 2001/0034734 A1 | 10/2001 | Whitley et al. | |
| 2002/0038456 A1 | 3/2002 | Hansen et al. | |
| 2002/0056119 A1 | 5/2002 | Moynihan | |
| 2002/0083005 A1 | 6/2002 | Lowenstein et al. | |
| 2002/0120939 A1 | 8/2002 | Wall et al. | |
| 2003/0001880 A1 | 1/2003 | Holtz et al. | |
| 2003/0087652 A1 | 5/2003 | Simon et al. | |
| 2003/0110209 A1 | 6/2003 | Loui et al. | |
| 2003/0135539 A1 * | 7/2003 | Kondo | G06F 17/30867 709/201 |
| 2003/0203717 A1 * | 10/2003 | Chuprun | G06K 13/0825 455/12.1 |
| 2003/0218625 A1 | 11/2003 | Allison | |
| 2003/0220813 A1 | 11/2003 | Gurvey | |
| 2004/0019696 A1 * | 1/2004 | Scott | H04L 29/06 709/242 |
| 2004/0027369 A1 | 2/2004 | Kellock et al. | |
| 2004/0057521 A1 | 3/2004 | Brown et al. | |
| 2004/0125877 A1 | 7/2004 | Chang et al. | |
| 2004/0162851 A1 * | 8/2004 | Nguyen | G06F 17/30557 |
| 2004/0197088 A1 | 10/2004 | Ferman et al. | |
| 2004/0252761 A1 | 12/2004 | Brown et al. | |
| 2005/0049855 A1 | 3/2005 | Chong-White et al. | |
| 2005/0053130 A1 | 3/2005 | Jabri et al. | |
| 2005/0111363 A1 * | 5/2005 | Snelgrove | G06Q 40/04 370/230 |
| 2005/0258983 A1 | 11/2005 | Jabri et al. | |
| 2006/0094455 A1 | 5/2006 | Hannu et al. | |
| 2006/0126603 A1 | 6/2006 | Shimizu et al. | |
| 2006/0173701 A1 | 8/2006 | Gurvey | |
| 2006/0242315 A1 * | 10/2006 | Nichols | H04N 7/17318 709/231 |
| 2007/0177606 A1 | 8/2007 | Jabri et al. | |
| 2007/0177616 A1 | 8/2007 | Jabri et al. | |
| 2007/0180135 A1 * | 8/2007 | Kenrick | H04L 29/06027 709/231 |
| 2007/0233671 A1 * | 10/2007 | Oztekin | G06F 17/30867 |
| 2008/0215662 A1 | 9/2008 | Kondo et al. | |
| 2008/0266378 A1 | 10/2008 | Ryu | |
| 2009/0059090 A1 * | 3/2009 | Fan | G07C 9/00031 348/734 |
| 2009/0144779 A1 * | 6/2009 | Wan | H04L 65/1069 725/62 |
| 2009/0156179 A1 | 6/2009 | Hahn et al. | |
| 2009/0193128 A1 * | 7/2009 | Motohashi | H04L 12/2856 709/228 |
| 2009/0307168 A1 | 12/2009 | Bockius et al. | |
| 2010/0299329 A1 | 11/2010 | Emanuel et al. | |
| 2012/0077536 A1 * | 3/2012 | Goel | H04L 65/4061 455/518 |
| 2013/0059575 A1 * | 3/2013 | Oesterling | H04W 4/046 455/422.1 |
| 2013/0229979 A1 * | 9/2013 | Liu | H04L 1/1893 370/328 |
| 2014/0223488 A1 * | 8/2014 | Korst | H04N 21/4668 725/53 |
| 2014/0304292 A1 * | 10/2014 | Valeriano | G06F 17/30864 707/769 |
| 2015/0237154 A1 * | 8/2015 | Wang | H04L 67/025 709/217 |

OTHER PUBLICATIONS

United States Office Action, U.S. Appl. No. 13/592,171, dated Oct. 31, 2014, 14 pages.

\* cited by examiner

BIDIRECTIONAL COMMUNICATION ON LIVE MULTIMEDIA BROADCASTS

CROSS REFERENCE TO RELATED APPLICATIONS

This application is a continuation application of U.S. patent application Ser. No. 13/592,171 filed on Aug. 22, 2012, now U.S. Pat. No. 9,185,152, issued Nov. 10, 2015, which claims priority to U.S. Provisional Application No. 61/527,480, filed Aug. 25, 2011, and U.S. Provisional Application No. 61/570,763, filed Dec. 14, 2011, which are incorporated by reference in their entirety.

BACKGROUND

1. Field of Art

The disclosure generally relates to the field of live multimedia broadcasting, and more particularly to live communications between consumers and multimedia broadcast providers.

2. Description of the Related Art

The presence of high-speed internet connections on desktop computers and mobile computing devices like smartphones and tablets has made live multimedia streams accessible to millions of users. Live multimedia streaming over the internet has made it possible for events like concerts, sporting competitions, and political rallies to be broadcast to large worldwide audiences in real time without the range limitations of television or radio broadcasts. Existing methods of delivering live multimedia to users consist of a one-way multimedia connection between a streaming server and the user client devices. The multimedia connection is devoted to delivering the multimedia stream, either directly or through a content delivery network (CDN), and the multimedia connection is not capable of transferring any telemetry information about the stream such as viewership data or connection quality.

Conventional methods of transferring this telemetry information are based on polling requests, which means a broadcaster must periodically query user clients to obtain important statistics such as the number of users receiving a given broadcast or the average connection quality for those users. This requires a significant amount of network traffic overhead that increases networking costs as the system is scaled up to accommodate more users and increase the frequency of polling requests. User clients are also limited by a poll-based system because they must repeatedly send requests to the streaming servers for crucial information like whether a broadcast of interest has come on-air or whether a closer or faster server is available for that broadcast. The delay and network load associated with poll-based communication systems also make it difficult for broadcasters and users to engage in two-way interactions like sharing user comments or collecting, aggregating, and distributing the results of a user poll in real-time.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
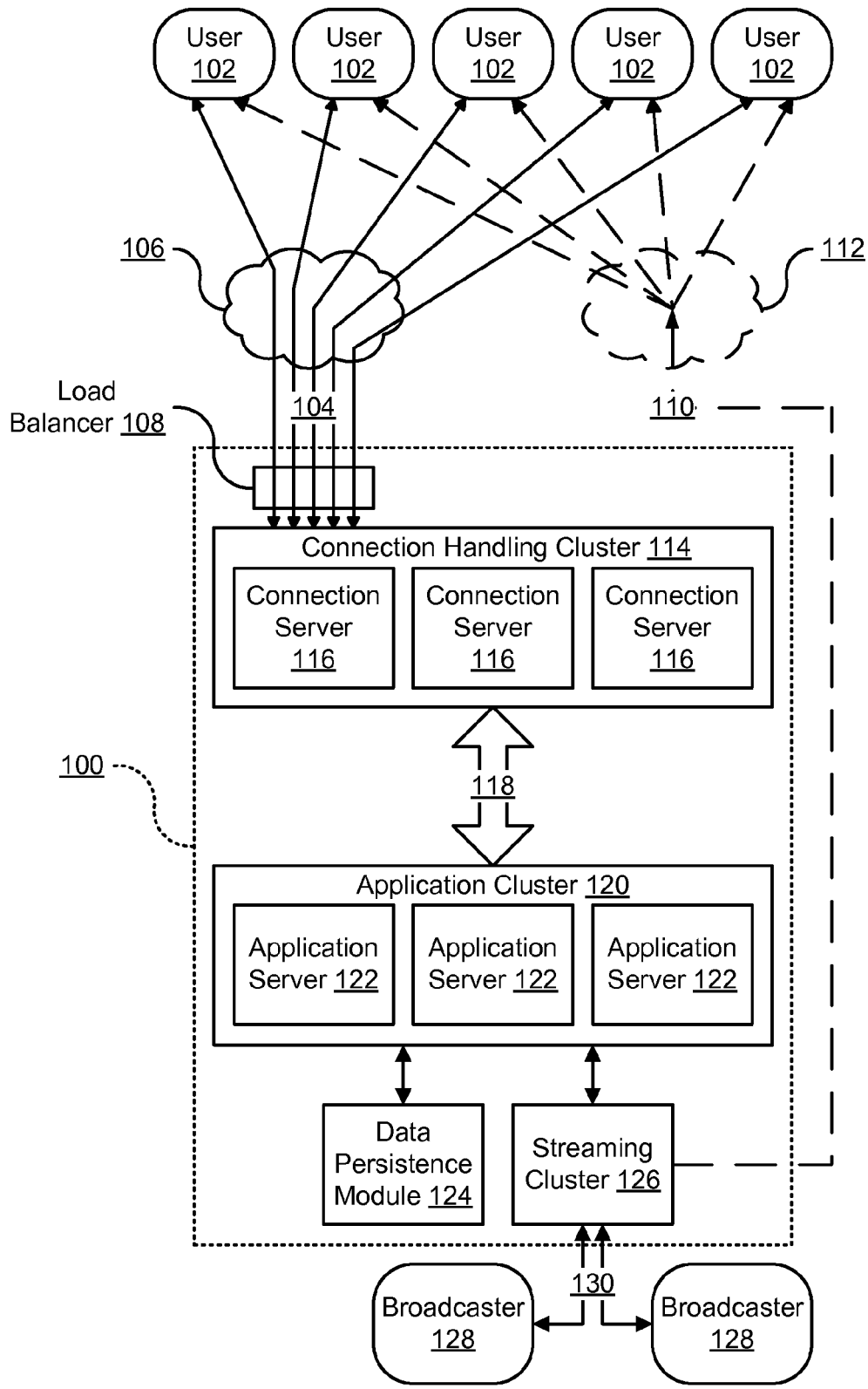
FIG. 1 is a high-level block diagram illustrating the logical architecture of a communication system, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments establish a bidirectional connection between a user and a multimedia stream distribution system separate from a multimedia connection between the user and the multimedia stream distribution system. The bidirectional connection communicates operational data to and from the user while the multimedia connection transfers a multimedia stream to the user. Providing a bidirectional connection separate from the multimedia connection is advantageous, among other reasons, because the operational data can be collected effectively at the multimedia stream distribution system independent of any limitations in the multimedia connection. Further, the multimedia stream distribution system assigns users to user groups based on any shared characteristics. Groups may be used to propagate information to the users as well as analyze information collected from the users in an efficient manner.

The operational data comprises non-multimedia data associated with at least one of content, quality, and process of reproducing a multimedia item at the user. Operational data may include, for example, information describing the connection quality experienced by users (e.g., frequency of connection failures, bandwidth consumption, and time spent buffering), client device information (e.g., operating system, browser, and hardware configuration of the client device), or user interaction data (e.g., a user poll initiated by a broadcaster).

The bidirectional connection comprises a connection between a user and the multimedia stream distribution system that allows communication in both directions. Users may use the bidirectional connection to send operational data to the multimedia stream distribution system, and the multimedia stream distribution system may use the bidirectional connection to send operational data to users.

As described herein, a user comprises a human user or a client device used by a human user. The client device is a computing device capable of communicating with the multimedia stream distribution system. The client device may include, for example, a laptop computer, a desktop computer, a smartphone, a tablet computer, a game console, an e-book reader, or a set-top box.

A global group as described comprises a user group that contains every user who is connected to the multimedia stream distribution system. The multimedia stream distribution system may use the global group to calculate global statistics that may be of interest to administrators of the multimedia stream distribution system. For example, the global group may be used to find aggregate performance metrics (e.g., average frequency of connection failures, average bandwidth consumption, and average time spent buffering) that can be used to measure the overall network performance of the multimedia stream distribution system.

The multimedia connection described herein refers to a connection that transfers multimedia streams from the multimedia stream distribution system to the user. The multimedia connection is separate from the bidirectional connection described above and typically carries more technical limitations than the bidirectional connection. The multimedia connection may allow limited communication from the user back to the multimedia stream distribution system, and the communication in this direction may be subject to significant latency or delay.

Description of Logical Architecture

Figure (FIG. 1 is a high-level block diagram illustrating the logical architecture of a multimedia stream distribution system 100, according to one embodiment. The multimedia stream distribution system 100 manages two-way communications with a plurality of users and broadcasters and initiates the delivery of multimedia streams to the users. The multimedia stream distribution system 100 may include, among other components, a load balancer 108, a connection handling cluster 114, a high-speed connection 118, an application cluster 120, a data persistence module 124, and a streaming cluster 126. The high-speed connection 118 connects the connection handling cluster 114 to the application cluster 120. The connection handling cluster 114 includes one or more connection servers 116. The application cluster 120 includes one or more application servers 122. Although illustrated as separate components, one or more of the connection servers 116, the application servers 122, the data persistence layer 124, and streaming cluster 126 may be embodied on a single computing device.

Users 102 may be client devices connecting to the connection handling cluster 114 when they wish to receive a multimedia stream. The client device may be a desktop computer running a desktop operating system such as Microsoft WINDOWS, Apple OS X, or a Linux distribution, or it may be a mobile computing device running a mobile operating system like Apple iOS, Google ANDROID, Palm OS, or WINDOWS PHONE. The client device communicates with the connection handling cluster using a web browser or an application that runs natively on the device's operating system. After the client device starts receiving a multimedia stream from the multimedia stream distribution system 100, the client devices uses a playback client to reproduce the stream for the user 102. The playback client may run within a web browser, or it may be a component of a native application that is used to communication with the connection handling cluster.

One of many features of the embodiment in FIG. 1 is the bidirectional connections 104 separate from the multimedia connection 110. The bidirectional connections 104 (represented by solid lines) communicate operational data between the users 102 and the connection handling cluster 114. On the other hand, the multimedia connection 110 (represented by dashed lines) delivers multimedia streams to the users 102. Establishing the bidirectional connections 104 separate from the multimedia connection 110 makes the bidirectional communication between the multimedia stream distribution system 100 and the users 102 immune to any technical limitations that may affect the multimedia connection 110.

A bidirectional connection 104 is established between each user 102 and the connection handling cluster 114 through a network 106. The bidirectional connections 104 may be embodied through one or more communications protocols, such as the Hypertext Transfer Protocol (HTTP), the Real Time Messaging Protocol (RTMP), or WebSocket. Data may be transferred through the network 106 using various combinations of communication links that support these protocols, including Ethernet, 802.11, 3G, 4G, CDMA, or digital subscriber line (DSL). In addition, the bidirectional connection 104 may be embodied through a push-based connection, which means all data transfers are initiated at the source of the transfer and neither the user 102 nor the connection handling cluster 114 has to poll the other entity for updates. A push-based bidirectional connection has the added benefits of fewer delays and lower network overhead. The connection does not rely on polling requests to initiate data transfers so that no time is spent waiting for polling requests and no network overhead is used to transfer polling requests.

Requests for bidirectional connections 104 from new users are first processed by a load balancer 104. The load balancer 104 maintains real-time data describing the resource use and availability of each connection server 116 within the connection handling cluster 114. When the load balancer 104 receives a new request for a bidirectional connection, the load balancer 104 assigns a connection server 116 to connect to the requesting user. Typically, the load balancer 104 assigns the new connection to a connection server 116 based on the load information of each connection server 116, as well known in the art (e.g., the bandwidth availability, computing load, or memory use of the connection servers 116).

Each of the connection servers 116 establishes bidirectional connections with a plurality of users and manages bidirectional communication with the users. In one example embodiment, each connection server 116 is capable of maintaining a maximum of 160,000 bidirectional user connections at once. The connection server 116 may aggregate the data being transferred through the plurality of bidirectional user connections 104 into a single high-speed connection 118 that connects to an application server 112 on the application cluster 120. The connection servers 116 may transfer data in both directions through the bidirectional user connections 104 and the high-speed connection 118. For example, the connection servers 116 might receive operational data through the high-speed connection 118 and send the operational data out to the users through the bidirectional connections 104, or they might receive multimedia stream requests, interaction feedback, or client device information from the users 102 through the bidirectional connections 104 and send them through the serialized connection 118 to be processed on an application server 122. The functionality of the connection servers 116 is described below in more detail in conjunction with FIG. 2.

Each connection server 116 also maintains a record of the users 102 to whom it is connected. A user profile is maintained in the memory of the connection server 116 for each connected user 102, and a copy of these user profiles is maintained on the application servers 122 that are connected to the connection server 116 through the high-speed connection 118. Whenever a change is made to the user profiles saved on the connection server 116 (e.g., when a user profile is created or deleted), the change is sent through the high-speed connection 118 and recreated on the application server 122. The opposite process occurs when a change is made to the user profiles stored on the application server 122; the change is sent through the high-speed connection 118 in the other direction and recreated on the connection server 126. The high-speed connection 118 allows a mirror of the user profiles to be maintained between the connection server 116 and the application server 122 with low latency.

The high-speed connection 118 provides a lossless high-speed data link between a connection server 116 and at least one application server 122. The high-speed connection 118 has enough bandwidth to accommodate the data that the connection server 116 transfers through the plurality of bidirectional user connections 104 in addition to any other data for transfer between the connection server 116 and the application servers 112 that it is connected to. Initially, each connection server 116 has a high-speed connection 118 to one application server 122, but high speed connections 118 to additional application servers 122 can be dynamically added if there is enough user traffic to overload the computing resources on the initial application server 122. In one embodiment, the high-speed connection 118 is sent over a normal Transmission Control Protocol (TCP) connection in a serialized format that can be serialized and deserialized quickly enough to accommodate the rate of data flow between the servers. By having the connection server 116 aggregate the bidirectional connections 104 into a single high-speed connection 118, the connection protocols and client devices of individual users are transparent to the application server 122.

The application servers 122 manage the communication that occurs with the users and executes the user group logic. The copy of the user profiles that is maintained on each application server is used to manage user groups. When a new user profile created on the connection server 116 is mirrored down to the application server 122, the application server 122 can assign the new user profile to any existing user group. In addition, the application server can maintain a record of active multimedia streams, create new user groups, aggregate any data collected from a user group, and manage interactions between broadcasters and user groups. Membership information for user groups is stored in memory on the application server 122 and a copy is maintained on the connection server 116. The high-speed connection 118 is used to mirror any changes in group membership between the two servers. These functions are described in further detail below in conjunction with FIG. 3.

The data persistence module 124 also maintains a list of active multimedia streams and may be configured to record and store active multimedia streams so the stored streams may be rebroadcast at a later time even if the original broadcaster 128 of the stream is no longer connected. To store and retrieve recordings of multimedia streams, the data persistence module 124 may interface with a database storage system with a storage capacity suitable for storing a large number of multimedia recordings. The data persistence module 124 may also offer a directory service for the database storage system.

The streaming cluster 126 handles functions associated with processing incoming multimedia streams from broadcasters 128 and preparing the streams for delivery to users 102. Broadcasters 128 establish a direct connection 130 to the streaming cluster 126 and send incoming multimedia streams to ingest servers located within the streaming cluster 126. When a new multimedia stream is received, the streaming cluster 126 informs the application servers 122 of the new stream. Each application server 122 subsequently updates its list of active multimedia streams, and the data persistence module 124 makes a corresponding update to its list of active multimedia streams. To send multimedia streams to users 102, a second connection 110 is established between the streaming cluster 126 and the users 102 who request the multimedia streams. As described above, the second connection 110 is dedicated to transferring streaming multimedia. The second connection 110 may be a direct connection between the users 102 the streaming server 126, or there may be a content delivery network (CDN) 112 between the users 102 and the streaming cluster 126 to increase bandwidth and reduce latency. The process of processing a user request for a multimedia stream and sending the requested stream to the user is described in detail in conjunction with FIG. 4.

The streaming cluster 126 also relays operational data between the broadcaster 128 and the application cluster 120. For example, if the broadcaster 128 is engaging in a user interaction, the broadcaster's request to initiate the interaction is sent through the streaming cluster 126 and processed on an application server 122, and the application server 122 sends aggregated user responses back to the broadcaster 128 through the streaming cluster 126. In one embodiment, the streaming cluster relays the operational data from application cluster 120 to the user over the same connection 130 that is used to transmit the multimedia stream from the broadcaster 128 to the streaming cluster 126. In alternative embodiments, the data may be relayed over a separate data connection between the streaming cluster 126 and the broadcasters 128, or the data may be relayed over a connection between broadcasters 128 and some other entity within the multimedia stream distribution system 100.

Figure 2:
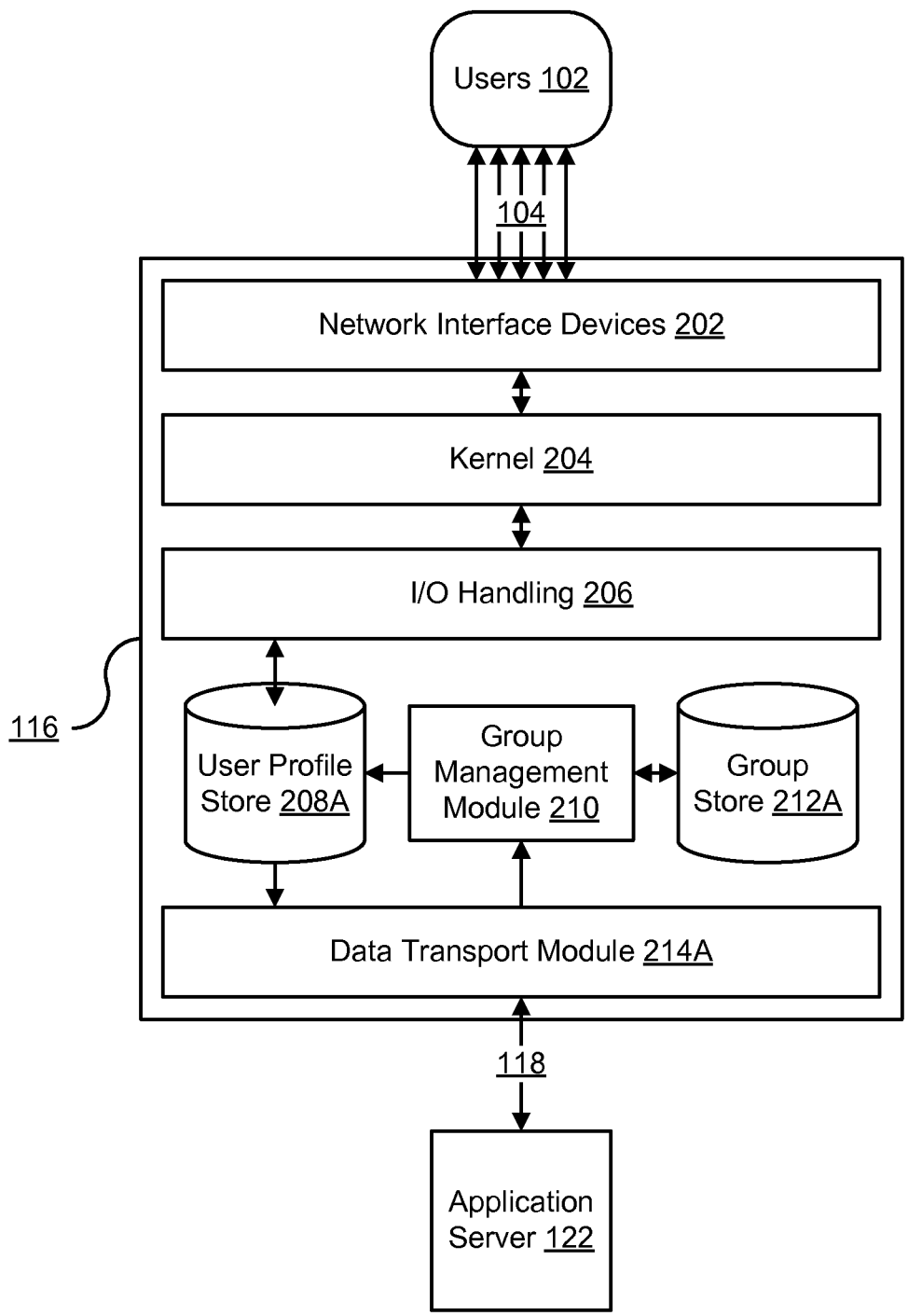
FIG. 2 is a block diagram illustrating a connection server within the real-time communication system, according to one embodiment.

FIG. 2 is a detailed view of a connection server 116 within the multimedia stream distribution system 100, according to one embodiment. As described above, the connection servers 116 establish bidirectional connections 104 and manage bidirectional communication with the users. The connection server 116 contains, among other components, one or more network interface devices 202, a kernel 204, input/output (I/O) handling 206, a user profile store 208A, a group creation module 210, a group store 212A, and a data transport module 214A.

The network interface devices 202 pass incoming and outgoing operational data between the bidirectional connections 104 and the kernel 204. The network interface devices 202 are compatible with one or more communications protocols, such as the Hypertext Transfer Protocol (HTTP), the Real Time Messaging Protocol (RTMP), and WebSocket, and the bidirectional connections 104 with the users 102 may be embodied through any communications protocol supported by the network interface devices 202. In addition, the network interface devices 202 support one or more physical interfaces that are used to carry the operational data being transferred over the bidirectional connections 104.

The kernel 204 and the I/O handling 206 process the operational data that is sent and received through the network interface devices 202. When one of the network interface devices 202 receives operational data from a user 102, the network interface device 202 passes the operational data to the kernel 204, and the kernel 204 routes the operational data to the I/O handling 206. In one embodiment, the I/O handling 206 analyzes the operational data and stores it in the user profile store 208A. If the I/O handling 206 receives operational data from a new user, the I/O handling 206 creates a user profile in the user profile store 208A for the new user. The kernel 204 and I/O handling 206 work in reverse when operational data is sent to users. The I/O handling 206 receives operational data and passes the operational data to the kernel 204. The kernel 204 passes the operational data to the network interface devices 202, and the operational data is sent out to the users 102.

As the number of connected users 102 increases, the user traffic through the network interface devices 202 may exceed the processing capabilities of a conventional kernel 204 and I/O handling 206. In one embodiment, the kernel 204 has support for Receive/Transfer Packet Steering (RPS/TPS) and the I/O handling 206 contains multiple computing cores that operate in parallel. The packet steering capabilities of the kernel 204 in this embodiment permit more efficient use of the computing resources in the I/O handling 206. As a result, the connection server 116 is able to support more bidirectional user connections 104 at once.

The user profile store 208A stores the user profiles that the I/O handling 206 creates and maintains for each connected user. A user profile contains characteristics about the user 102 that are found in the operational data received from the user 102. Information stored in a user profile may include the user's Internet Protocol (IP) address, bandwidth usage, operating system, web browser, hardware configuration, or responses to interactions such as poll questions. After the I/O handling 206 updates user profile information in the user profile store 208A with newly received operational data, the user profile store 208A sends the operational data to the data transport module 214A so the operational data can be sent over the high-speed connection 118 for further processing in the application server 122.

The group management module 210 maintains and updates the information in the group store 212A. After a user is assigned to new groups in the application server 122, the application server 122 sends the user's group assignments through the high-speed connection 118 and the data transport module 214A to the group management module 210. After the group management module 210 receives the user's group assignments, it updates the group membership information in the group store 212A to include the new user. The group management module also recreates new user groups in the connection server's group store 212A after they are created on the application server 122. When a new group is created on the application server 122, the application server 122 does not send a list of the new group's members to the group management module 210. Instead, the group management module 210 receives the common characteristic that is shared among the new group's members. The group management module 210 finds the user profiles in the user profile store 208A that possess the common characteristic, creates a new group in the group store 212A, and assigns those user profiles to the new group. By recreating new groups on the connection server 116, the network traffic over the high-speed connection 118 is reduced while still ensuring that a copy of the new group's membership information exists on both the connection server 116 and the application server 118.

The group management module 210 also receives requests from the application server 122 and uses information stored in the group store 212A and the user profile store 208A to execute those requests. For example, when the group management module 210 receives a request to send a message to each user in a group, it retrieves a list of the target group's members from the group store 212A. Then the group management module 210 identifies each of the group's members in the user profile store 208A and instructs the user profile store 208A to use the digital contact information (e.g., the IP address) in each group member's user profile to send the message to the user. The connection server 116 maintains a copy of the group membership information in the group store 212A so that the application server 122 can send operational data each user in a group by sending a single request over the high-speed connection 118 to the connection server 116. As a result, the application server 122 performs less processing and can devote more resources to other tasks, such as assigning users to groups or managing user interactions.

The data transport module 214A processes data that is sent through the high-speed connection 118. In the above embodiment where the high-speed connection 118 is a serialized connection over the Transport Control Protocol (TCP), the data transport module 214A serializes data before sending it to the application server 122 and deserializes data that is received from the application server 122. The data transport module 214A also maintains a mirror of the user profile store 208A on the application server 122. When a new user profile is created in the user profile store 208A on the connection server 116, the data transport module 214A sends the new user profile to the application server 122, where it is recreated in the application server's mirror of the user profile store.

Figure 3:
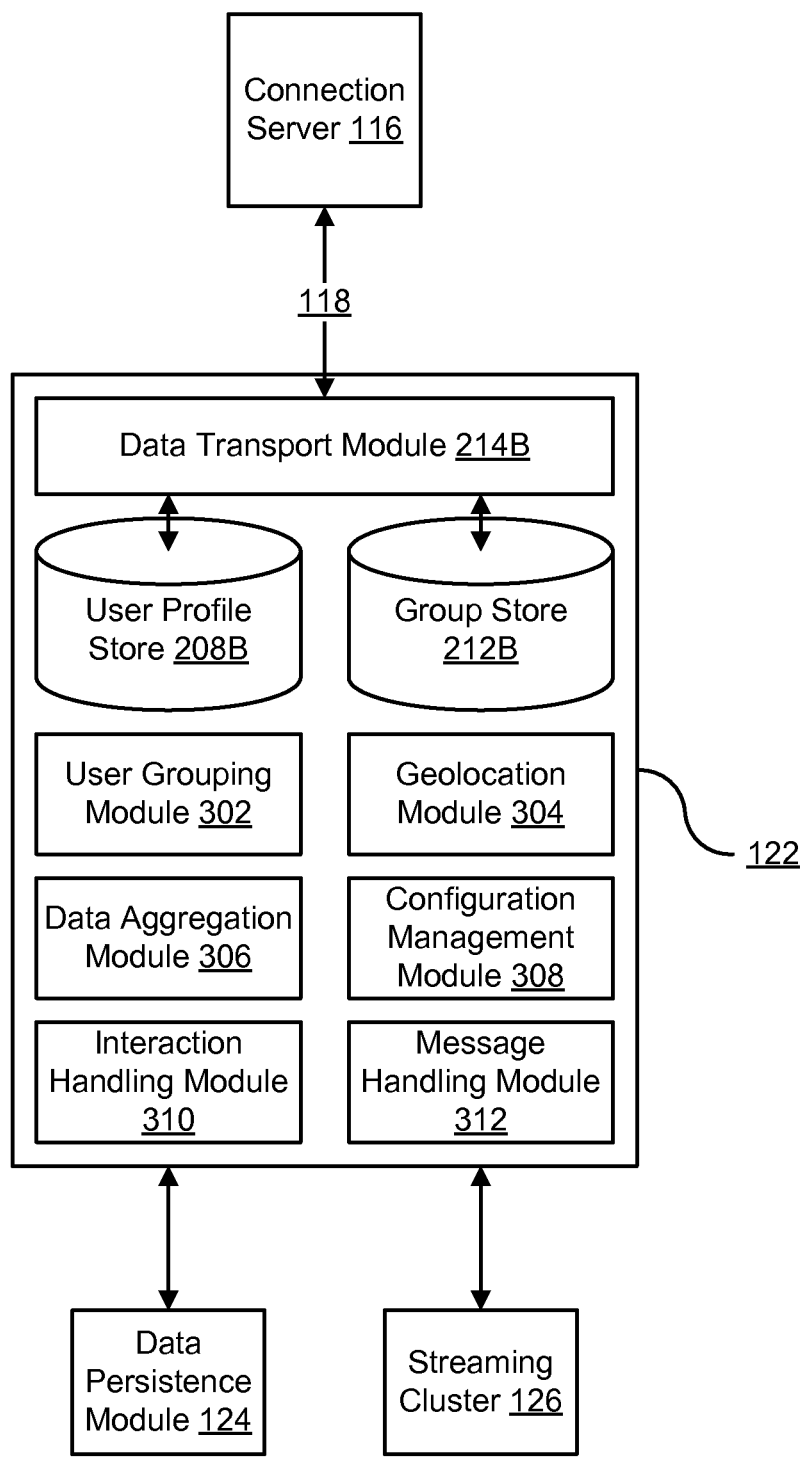
FIG. 3 is a block diagram illustrating an application server within the real-time communication system, according to one embodiment.

FIG. 3 is a detailed view of an application server 122 within the multimedia stream distribution system 100, in one embodiment. As described in conjunction with FIG. 1, the application servers 122 manage communication between the multimedia stream distribution system 100 and the users 102. The application server 122 may contain, among other components, a data transport module 214B, a user profile store 208B, a group store 212B, a user grouping module 302, a geolocation module 304, a data aggregation module 306, a configuration management module 308, an interaction handling module 310, and a message handling module 312. A high-speed connection 118 connects the application server 122 to a connection server 116, and the application server 122 is also connected to the data persistence module 124 and the streaming cluster 126.

The application server 122 contains a copy of the data transport module 214A on the connection server 116. Similar to the data transport module 214A on the connection server 116, the data transport module 214B on the application server 122 processes data that is transferred over the high-speed connection 118. In the embodiment described above where the high-speed connection 118 is a serialized connection over the Transmission Control Protocol, the data transport module 214B serializes data before it sends the data to the connection server 116 and deserializes data after it receives the data from the connection server.

The data transport module 214B also maintains copies of the user profile store 208B and the group store 212B. In the description of FIG. 3 set forth below, the user profile store 208B on the application server will be referred to as the local user profile store 208B. Likewise, the group store 212B on the application server 122 will be referred to as the local group store 212B. If a change is made to the local user profile store 208B, the data transport module 214B sends a command to the connection server 116 to make a corresponding change on the user profile store 208A on the connection server 116. The same mirroring process occurs if a change occurs to a local group store 212B (e.g., when a new user is added to one or more groups). If a change is made to either the user profile store 208A or the group store 212A on the connection server 116, the data transport module receives a command from the connection server 116 to make a corresponding change on the local user profile store 208B or the local group store 212B. Generally speaking, the two data transport modules 214 work in conjunction to maintain mirrors of the user profile stores 208 and the group stores 212 between the connection server 116 and the application server 122. By maintaining mirrors of the user profile store 208 and the group store 212, the processes that run on the application server 122 are not constrained by the web browser, viewing application, operating system, or connection protocol of individual users 102.

The user grouping module 302 manages the group data on the local group store 212B. When a new user profile is mirrored down to the local user profile store 208B, the user grouping module analyzes the characteristics saved in the new user profile and assigns the new user profile to one or more user groups based on those characteristics. For example, if the new user profile contains information indicating that the new user is using a certain operating system, then the user grouping module 302 might assign the new user profile to a group of users who are using the same operating system. To assign a new user to a group, the user grouping module accesses the local group store 212B and modifies the group's membership information to add a reference to the user profile corresponding to the new user. A group assignment also occurs when a user requests a multimedia stream. When the user grouping module 302 detects a user's request to receive a multimedia stream, the user grouping module 302 assigns the corresponding user profile to a group for users who are watching the same multimedia stream. Again, the user grouping module 302 assigns the user to the group by modifying the group membership data on the local group store 212B. By maintaining user groups that list the audience of a multimedia stream, the broadcaster or the multimedia conversion system can easily interact with every user receiving a stream.

The user grouping module 302 also creates new user groups in the local group store 212B in response to group creation requests. Either a broadcaster or the multimedia stream distribution system 100 can submit a group creation request, and the group creation request contains at least one common characteristic that is shared by all the users who will be members of the group. For example, a broadcaster may request the creation of a group for users located in a certain city who are receiving a certain multimedia broadcast. The multimedia stream distribution system 100 may also request the creation of a global group for every user who is connected to the multimedia stream distribution system 100. When the user grouping module 302 receives a request to create a new group, the user grouping module 302 searches the local user profile store 208B and generates a list of user profiles that share characteristics specified in the group creation request. After the user grouping module 302 has a list of the user profiles that will be assigned to the new group, the user grouping module 302 creates a new group object in the local group store 212B and populates the new group's membership information with the user profiles. As described above, the data transport module 214B also sends the group creation request to the connection server 116, and the group is recreated on the connection server's copy of the group store 212A.

The geolocation module 304 uses information collected from users to determine their geographic location. The geolocation module 304 may use any data received from the user that contains information about the user's location, such as the user's Internet Protocol (IP) address or Global Positioning System (GPS) coordinates from the GPS module that is part of some mobile devices. The user grouping module 302 uses the geolocation module 304 to locate users when it receives a request to create a new group for users in a common geographical location or assign a new user to a group based on the new user's geographic location. The use of the geolocation module 304 allows the multimedia stream distribution system 100 to offer location-specific communication to users without having users manually input their locations.

The data aggregation module 306 aggregates the operational data from all users in a given group into a single set of statistics. The data aggregation module 306 can be used to calculate any statistics that may be of interest to the multimedia streaming system 100. For example, the data aggregation module 306 may calculate aggregate connection quality statistics for the users connecting through a certain Internet Service Provider (ISP) or from a certain geographic region. The statistics may include, for example, average number of connection failures, average bandwidth consumption, or average time spent buffering. If the statistics indicate that the users in the group are experiencing poor connection quality, then the data can be relayed to the configuration management module 308 to determine if any action can be taken to improve the connection quality for the users in the group. To generate more comprehensive statistics, the aggregation of operational data can also be performed on a global group that includes every user who is currently connected to the multimedia stream distribution system 100.

The configuration management module 308 receives data from the data aggregation module 306 when the data indicates that a given user group is experiencing poor connection quality or some other sort of poor performance. After it receives the data, the configuration management module 308 analyzes the data to determine whether any action can be taken to improve the group's connection quality. For example, the multimedia stream distribution system 100 might be unable to improve connection quality for a group of users who are connecting on mobile phones through a slower network technology, such as Enhanced Data rates for GSM Evolution (EDGE), but it might attempt to make configuration changes if a group of users in a certain geographical location is experiencing an abnormally high rate of connection failures. If the configuration management module 308 determines that an action can be taken to improve the group's connection quality, it sends the appropriate instructions to the streaming cluster 126. For example, the configuration management module 308 may instruct the streaming cluster 126 to increase resources (e.g., computing and network resource) associated with the group, increase availability of a content delivery network (CDN) for the group, or deploy other additional resources to increase the bandwidth available to the group.

The configuration management module 308 also processes requests from users to receive multimedia streams. After multimedia stream distribution system 100 receives a user's request to receive a multimedia stream, the configuration management module 308 sends a streaming endpoint for the requested multimedia stream to the user 102. The user 102 can subsequently use the streaming endpoint to connect to the streaming cluster 126 and have the streaming cluster 126 send the requested stream to the user 102. In addition, the configuration management module 308 may work with the message handling module 312 to configure a user's playback client in real-time based on the multimedia stream that is being sent to the user 102. For example, the configuration management module 308 may identify the user group corresponding to a particular broadcaster and send a request to the message handling module 312 to display the broadcaster's logo and/or a list of upcoming multimedia broadcasts from the broadcaster 128 in the playback client of those users. This additional content that is displayed enhances the users' experience and encourages the users to continue using the multimedia stream distribution system 100 to view additional broadcasts from the same broadcaster 128.

The interaction handling module 310 works with the message handling module 312 to handle bidirectional interactions between broadcasters 128 and users 102. The interaction handling module 310 receives requests from broadcasters 128 to initiate user interactions. The interaction request typically includes a dataset describing the interaction. For example, a broadcaster 128 who wishes to initiate a user poll would submit a dataset containing the poll questions and one or more answer choices. The interaction handling module 310 identifies the target group for the interaction and adds the corresponding group identifier to the interaction request. The target group is typically the group of users receiving the broadcaster's multimedia stream, but the broadcaster may also request a narrower group. For example, the broadcaster may wish to limit its interaction to users who are receiving the multimedia stream in a certain geographic region. After the interaction handling module 310 identifies a target group and adds the group identifier to the interaction request, the interaction handling module 310 passes the request to the message handling module 312.

The message handling module 312 receives requests from the interaction handling module 310 and the configuration management module 308, uses the information in the request to generate a message object, and sends the message object to users in the target group identified in the request. The message handling module 312 uses the dataset describing the interaction to create a message object. For example, the message handling module 312 would generate a message object for a user poll by extracting the poll question and answer choices and placing them in the message object. As another example, the message handling module 312 would generate a message object with a broadcaster's logo after receiving a request from the configuration management module 308 to display a broadcaster's logo in the playback clients of the users 102 who are receiving one of the broadcaster's multimedia streams. After the message object is generated, the message handling module 312 instructs the connection server 116 to send the message object to users in the target group.

As users receive the interaction, the users respond and send information back to the multimedia stream distribution system 100. The interaction handling module 310 receives and aggregates the user interaction feedback into a single set of statistics. For the user poll example described above, the interaction handling module would add up the number of responses for each answer choice. The interaction handling module 310 then sends aggregated feedback to the broadcaster 128. The aggregated feedback can also be sent back out to the users 102. If the bidirectional connections 104 between the users 102 and the connection servers 116 are embodied as push-based connections, then the interaction handling module 310 can continuously aggregate the user interaction feedback (e.g., user poll results) and send out the aggregated results. The ability to perform live feedback aggregation and send continuously-updated results to users allows for a more dynamic and interactive user experience during user interactions.

Establishing Connections with New Users

Figure 4:
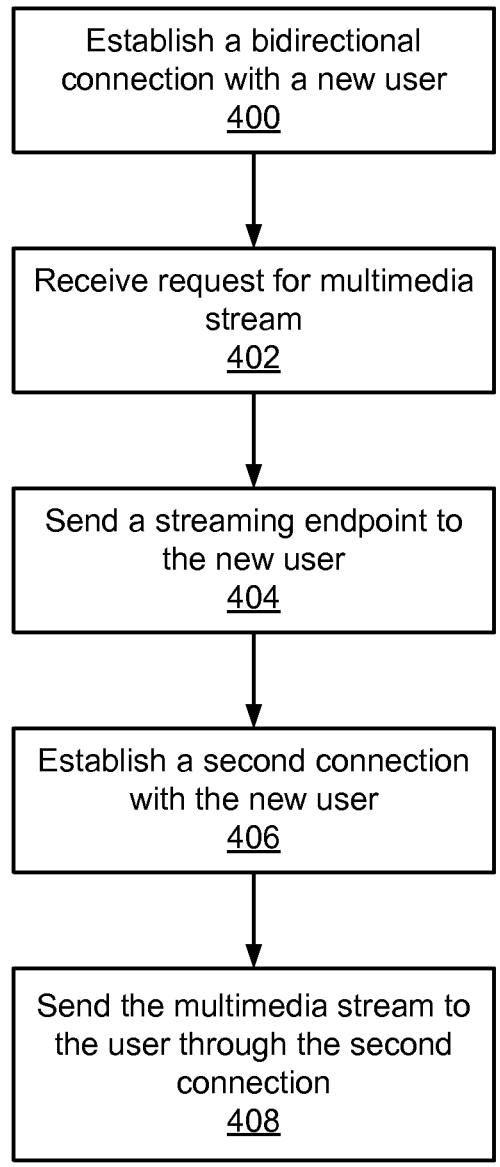
FIG. 4 is a flow chart illustrating the process of fulfilling a new user's request for a multimedia stream, according to one embodiment.

FIG. 4 is a flow chart of an example process for fulfilling a new user's request for a multimedia stream, according to one embodiment. The process begins by establishing 400 a bidirectional connection 104 between a new user 102 and the connection handling cluster 114. When a new user 102 submits a connection request to the multimedia stream distribution system 100, the load balancer 108 receives the connection request and analyzes load information for each connection server 116 in the connection cluster 114 to determine which connection server 116 is to be connected. After the load balancer 108 selects a connection server 116, the load balancer 108 instructs the connection server 116 to establish a bidirectional connection 104 with the new user 102.

After the bidirectional connection 104 is established between the new user 102 and the selected connection server 116, the user can request 402 to receive a multimedia stream. The connection server 116 receives the stream request and forwards the request to the connected application server 122 over the high-speed connection 118. The application server 122 maintains a list of active broadcasts and sends 404 a multimedia streaming endpoint to the new user 102 through the connection server 116. The multimedia streaming endpoint contains information that allows the new user 102 to connect to the streaming cluster 126 and receive the requested multimedia stream.

The new user 102 uses the multimedia streaming endpoint to establish 406 a second connection 110 with the multimedia stream distribution system 100 that operates alongside the bidirectional connection 104 between the connection server 116 and the new user 102. The second connection 110 connects the new user 102 to the streaming cluster 126, which allows the streaming cluster 126 to transfer the requested multimedia stream to the new user 102. A content distribution network (CDN) 112 may be used as part of the second connection 110 to increase bandwidth and reduce latency. The bidirectional connection 104 between the new user 102 and the connection server 116 remains in place after the second connection 110 is established, and the multimedia stream distribution system 100 continues to use the bidirectional connection 104 to communicate with the new user 102.

After the second connection 110 is established 406, the application server 122 instructs the streaming cluster 126 to send 408 the multimedia stream to the user through the second connection 110. After the new user 102 starts receiving the multimedia stream through the second connection 110, the bidirectional connection 104 between the new user 102 and the connection handling server 116 remains in place. The bidirectional connection 104 is used to transfer operational data between the multimedia stream distribution system 100 and the new user 102 as the new user receives the stream through the second connection 110. By transferring the operational data through the bidirectional connection 104, the operational data can be collected at the multimedia stream distribution system 100 independent of any limitations in the second connection 110.

Figure 5:
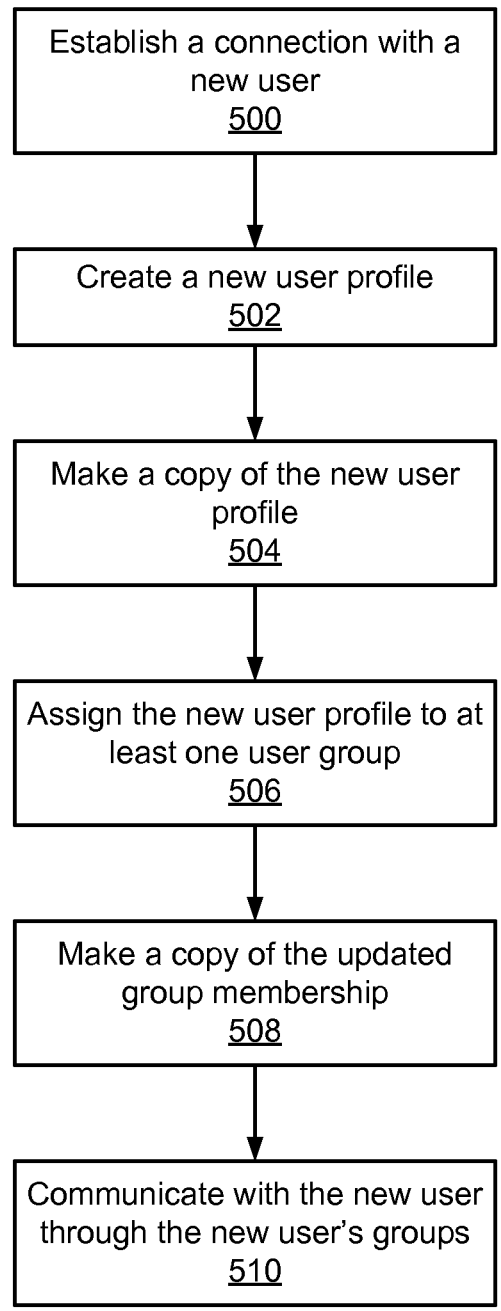
FIG. 5 is a flow chart illustrating the process of assigning a new user to at least one user group and establishing communication with the new user through his or her group memberships, according to one embodiment.

FIG. 5 is a flow chart illustrating the process of assigning a new user 102 to at least one user group and establishing bidirectional communication with the user through the user's new group memberships, according to one embodiment. The process begins when a new user 102 establishes 500 a bidirectional connection 104 with a connection handling server 116 in accordance with the process described in FIG. 4. After the bidirectional connection 104 is established, the network interface devices 202 receive initial operational data describing the new user 102. The initial operational data may include the new user's Internet Protocol (IP) address, operating system, or browser. The network interface devices 202 pass the initial operational data to the kernel 204, and the kernel 204 passes the data to the I/O handling 206 where it is processed.

After receiving the initial operational data from a new user 102, the I/O handling 206 instructs the group management module 210 to create 502 a new user profile in the user profile store 208A and adds the initial operational data to the new user profile. The new user profile can then be copied 504 to another location. In one embodiment, the user profile store 208A sends the new user profile to data transport module 214A, and the data transport module 214A sends the new user profile over the high-speed connection 118 to be replicated on the application server's mirror of the user profile store 208B.

Next, the user grouping module 302 modifies the membership information in the group store 212B to assign 506 the new user profile to at least one user group. The user grouping module 302 may assign the new user profile to a geographic group using location information received from the geolocation module 304. The user grouping module 302 may also assign the new user profile to groups based on the new user's web browser, viewing application, or operating system information. If the new user 102 submits a request to receive a multimedia stream, the user grouping module 302 may also assign the corresponding user profile to a group of users who are receiving the same multimedia stream. A copy of the updated group membership information may be made 508 after the user grouping module 302 makes group assignments for the new user profile. In one embodiment, the updated group membership information in the group store 212B is send to the data transport module 214B, and the data transport module 214B sends the information over the high speed connection 118 to be replicated on the connection server's mirror of the group store 212A.

After the new user profile has been assigned to one or more groups, the multimedia stream distribution system 100 can use the new user's group memberships to communicate 510 with the new user 102. For example, the multimedia stream distribution system 100 may receive connection quality information from the new user 102, aggregate the new user's connection quality information with connection quality information received from other users in one of the new user's groups, and use the aggregate information to determine if the streaming cluster 126 can take any action to improve the connection quality for the users in the group. The new user's group memberships also allow the new user 102 to engage in two-way interactions with a broadcaster 128, such as a user poll.

In other embodiments, the multimedia stream distribution system 100 may assign 506 the new user profile to user groups without making a copy 504 of the new user profile. Similarly, the multimedia stream distribution system 100 may start communicating 510 with the new user through the new user's group memberships without making a copy 508 of the updated group membership. The steps of copying 504 the new user profile and copying 508 the updated group membership allow the multimedia stream distribution system 100 to maintain its data in a way that reduces unnecessary processing, but these copying steps 504, 508 are not critical to the functionality of the multimedia stream distribution system 100.

In addition, some of the steps shown in FIG. 5 may occur in a different order or in parallel. For example, the multimedia stream distribution system 100 may create 502 the new user profile in parallel with assigning 506 the new user to groups. It is possible for the multimedia stream distribution system 100 to determine a new user's group assignments before the new user profile is created because the multimedia stream distribution system can analyze the initial operational data received when the connection is established 500 for information about the new user. In addition, the copy 504 of the new user profile may be made in parallel with or after any step that occurs after the new user profile is created 502. Similarly, the copy 508 of the updated group membership may be made in parallel with or after the multimedia stream distribution system 100 starts communicating 510 with the new user through the new user's group memberships.

Real-Time Bi-Directional Communication with Users

Figure 6:
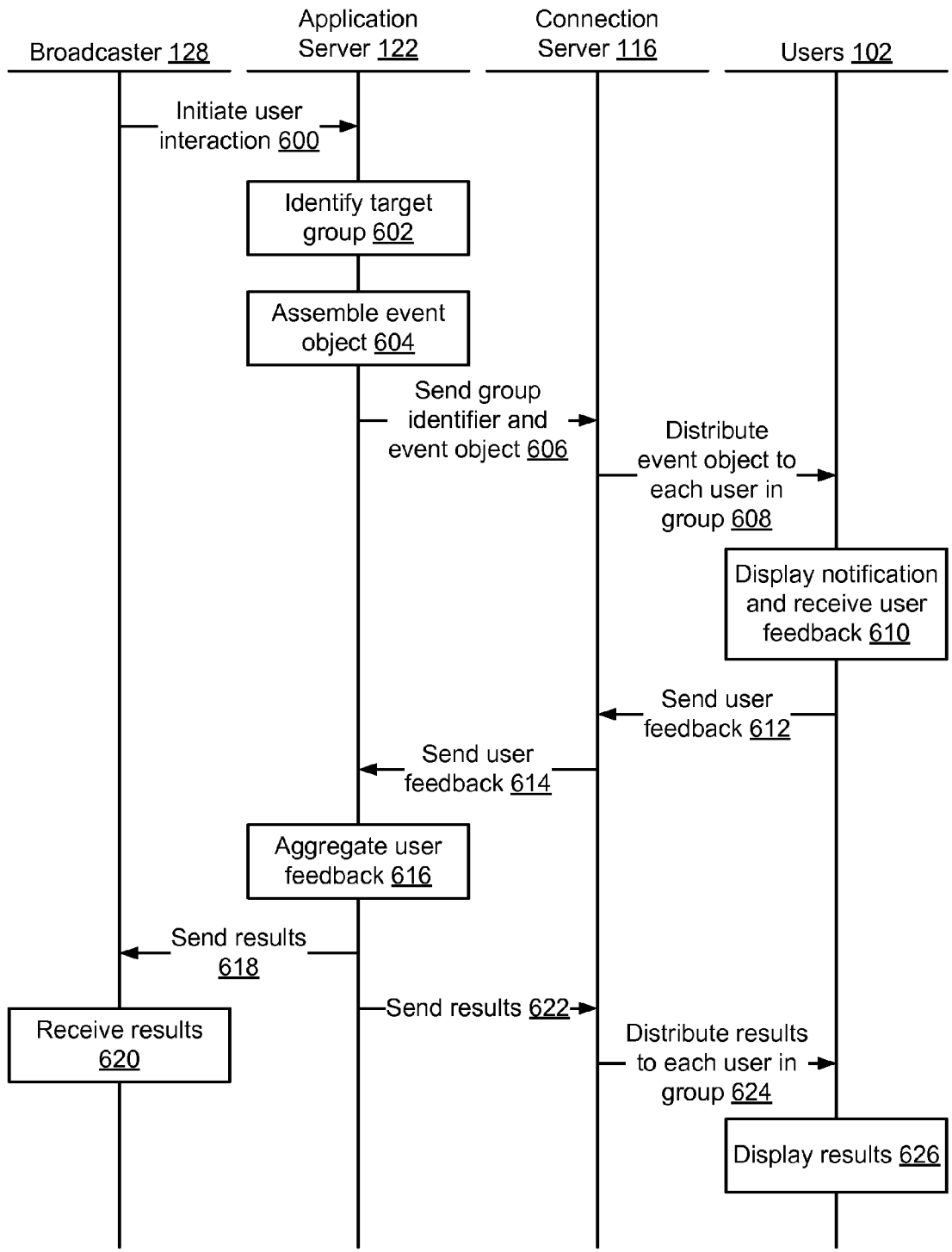
FIG. 6 is an interaction diagram illustrating how a two-way interaction between a broadcaster and a user group is handled by the real-time communication system, according to one embodiment.

FIG. 6 is an interaction diagram illustrating how the multimedia stream distribution system handles 100 a two-way interaction with a user group, according to one embodiment. As used herein, a user interaction is an activity that involves bidirectional communication between one or more users 102, the multimedia stream distribution system 100, and a broadcaster 128. To initiate 600 the user interaction, the broadcaster 128 sends an interaction dataset to the streaming cluster 126, and the streaming cluster 126 passes the dataset to the interaction handling module 310 in the application server 122. The interaction dataset contains information to fully define the user activity. For example, a broadcaster 128 can initiate a user poll by sending an interaction dataset containing the poll question and a plurality of answer choices.

After receiving the interaction dataset, the interaction handling module 310 validates the interaction dataset to ensure that it is complete. For example, an interaction dataset for a user poll would not pass validation if the dataset does not contain at least two answer choices. After the interaction dataset is validated, the interaction handling module 310 identifies 602 a target group for the interaction. Typically, the target group is the group of users who are receiving the broadcaster's multimedia stream. However, the broadcaster 128 may request to use a narrower target group that is subject to additional criteria. For example, the broadcaster 128 may limit the interaction to users who are using a certain operating system to receive the multimedia stream, or to users who are receiving the multimedia stream in a certain geographic region. After a valid target group is identified, the interaction handling module 310 retrieves the corresponding group identifier from the group store 212B. After the interaction handling module 310 receives a valid group identifier from the group store 212B, the interaction handling module 310 sends the interaction dataset and the group identifier to the message handling module 312.

The message handling module 312 assembles 604 the interaction dataset into a message object containing a notification message for the event. For the example of a user poll, the message handling module 312 would generate the notification message by extracting the question and answer choices from the interaction dataset and arranging them on separate lines. After the message object is assembled, the application server 122 sends 606 the group identifier and the event object over the high-speed connection 118 to the connection server 116.

The connection server 116 receives the message object and group identifier and distributes 608 a copy of the message object to each user in the target group over the bidirectional connections 104. Since the connection server 116 has copies of the group store 212A and the user profile store 208A, it can identify the Internet Protocol (IP) addresses (or other digital contact information) of each user in the target group without querying another entity. By maintaining copies of the group store 212A and the user profile store 208A on the connection server 116, the connection server 116 can send the same communication to each user in a target group after receiving the communication and target group identifier from the application server 112. The connection server's ability to send out multiple communications in response to a single request from the application server 122 reduces the outgoing traffic of the application server 122 and the networking traffic over the high-speed connection 118.

As the users 102 in the target group receive the message object, the notification message stored in the message object is displayed 610 on the users' client devices. The notification message gives users the option of providing interaction feedback, such as the ability to choose an answer choice in a user poll. As the users' client devices receive 610 feedback from their respective users 102, they send 612 the user feedback over the bidirectional connection 104 to the connection server 116. The connection server 116 receives the user feedback and sends 614 it over the high-speed connection 118 to the application server 122, and the interaction handling module 310 aggregates 616 the user feedback into a single set of statistics. For a user poll, the interaction handling module 310 would aggregate the user feedback by adding up the total number of users who chose each answer choice. If the bidirectional connection is embodied as a push-based connection that can transfer data on demand, then the aggregation process can occur continuously. In other words, the interaction handling module 310 receives interaction feedback from a user 102 immediately after the user 102 provides the feedback to the user's client device, and the interaction handling module 310 updates the aggregated statistics each time it receives interaction feedback.

Once the interaction handling module 310 begins receiving and aggregating the interaction feedback, the interaction handling module 310 starts sending 618 the results to the broadcasters 128. If the connection between the broadcasters 128 and the multimedia stream distribution system 100 is also embodied as a bidirectional push-based connection that can transfer data on demand, then the application server 122 can send the broadcaster 128 live statistics that are updated to incorporate additional interaction feedback from users as the additional interaction feedback is received.

The interaction handling module 310 can also send the aggregated statistics back out to the users 102. Again, the high-speed connection is used to reduce the network traffic between the application server 122 and the connection server 116. The application server 122 sends 622 the target group identifier and a single copy of the aggregated statistics to the connection server 116, and the connection server 116 distributes 624 the results to each user 102 in the user group. The results can then be displayed 626 on each user's client device. The results that are displayed on the user devices can be continuously updated if the bidirectional connections 104 between the connection server 116 and the users 102 are embodied as push-based connections that can transfer data on demand. For example, users can watch poll results being continuously updated as the interaction handling module 310 receives and aggregates additional user responses.

Although the actions of sending 618 the results to the broadcaster 128 and sending 622 the results to the users 102 are described as occurring sequentially, they may also occur simultaneously or in the opposite order. There may also be a delay between one action and the other, regardless of the order in which the two actions occurred.

Although they are depicted as separate entities, the application server 122 and the connection server 116 may also be embodied as a single device that manages communication with users and maintains the bidirectional connections. In embodiments where the application server 122 and the connection server 116 are a single device, the communications 606, 614, 622 between the application server 122 and the connection server 116 do not occur. Instead, the single device performs the tasks of the application server 122 and communicates directly with the users 102. While a single-device configuration would still be capable of providing the bidirectional data connection in parallel with the second multimedia connection, the single-device configuration would be able to handle significantly fewer user connections at once. Separating the functionality of the multimedia stream distribution system 100 into a connection handling cluster 114 and an application cluster 120 offers a significant technical advantage over a single-device configuration because the separated configuration increases the distribution system's scalability, redundancy, and security.

In addition to the above-mentioned benefits of dividing the functionality of the multimedia stream distribution system 100 into a connection handling cluster 114 and an application cluster 120, the disclosed configuration also carries additional benefits and advantages. The separate bidirectional connection 104 allows the multimedia stream distribution system 100 to exchange operational data with users 102 independent of any restrictions that may be associated with the multimedia connection 110. For example, operational data may be pushed over the bidirectional connection 104 in both directions, which is not possible in typical multimedia connections that are used to transfer multimedia streams to users 102. In addition, the user groups that are maintained on the application servers 122 allow broadcasters 128 to engage in interactions with users 102 with lower latency. Together, the push-based nature of the bidirectional connection 104 and the group logic on the application servers 122 allow for real-time user interactions, such as poll results that are displayed and updated in playback clients in real-time. These capabilities allow broadcasters 128 to provide a more interactive and immersive user experience.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as described with reference to FIGS. 1, 2, and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for establishing and maintaining bidirectional communication with users of multimedia broadcasts through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for remotely exchanging data over a network comprising:
   establishing a bi-directional connection between a user and a computing device, wherein the computing device is configured to transmit multimedia items to a plurality of users, the plurality of users comprising the user, the bi-directional connection configured to bidirectionally transmit operational data representing data associated with at least one of content, quality, and process of reproducing a multimedia item at the user;
   establishing a one-way connection with the user, the one-way connection configured to transmit the multimedia item from the computing device to the user; and
   at the computing device, sending the multimedia item to the user through the one-way connection between the computing device and the user.

2. The method of claim 1, further comprising receiving a request for the multimedia item, the computing device establishing the bi-directional connection responsive to receiving the request.

3. The method of claim 1, wherein transmissions of the operational data over the bi-directional connection are initiated at a source of the operational data.

4. The method of claim 1, wherein the operational data comprises at least one of information describing a network connection quality associated with the user, client device information, and user interaction data.

5. The method of claim 1, further comprising:
   creating a user profile for each user of the plurality of users, the user profile of each user describing characteristics of each user;
   assigning a first subset of the plurality of users to a first user group and a second subset of the plurality of users to a second user group based on the user profiles of the plurality of users, each subset of the first and second subsets of the plurality of users sharing at least one common characteristic shared by all users in each subset; and
   communicating with the plurality of users by propagating a communication to the first user group or the second user group.

6. The method of claim 5, wherein the user profile of the user comprises characteristics collected from the user.

7. The method of claim 5, further comprising:
   responsive to propagating the communication to the first user group or the second user group, receiving feedback data from members of the first user group or the second user group;
   processing the feedback data into a set of aggregate statistics; and
   updating the aggregate statistics responsive to receiving additional feedback data from additional members of the first user group or the second user group.

8. A non-transitory computer readable medium storing instructions, the instructions being executable by a processor to implement a method for remotely exchanging data over a network, said method comprising:
   establishing a bi-directional connection between a user and a computing device, wherein the computing device is configured to transmit multimedia items to a plurality of users, the plurality of users comprising the user, the bi-directional connection configured to bidirectionally transmit operational data representing data associated with at least one of content, quality, and process of reproducing a multimedia item at the user;
   establishing a one-way connection with the user, the one-way connection configured to transmit the multimedia item from the computing device to the user; and
   at the computing device, sending the multimedia item to the user through the one-way connection between the computing device and the user.

9. The non-transitory computer readable medium of claim 8, said method further comprising receiving a request for the multimedia item, the computing device establishing the bi-directional connection responsive to receiving the request.

10. The non-transitory computer readable medium of claim 8, wherein transmissions of the operational data over the bi-directional connection are initiated at a source of the operational data.

11. The non-transitory computer readable medium of claim 8, wherein the operational data comprises at least one of information describing a network connection quality associated with the user, client device information, and user interaction data.

12. The non-transitory computer readable medium of claim 8, said method further comprising:
   creating a user profile for each user of the plurality of users, the user profile of each user describing characteristics of each user;
   assigning a first subset of the plurality of users to a first user group and a second subset of the plurality of users to a second user group based on the user profiles of the plurality of users, each subset of the first and second subsets of the plurality of users sharing at least one common characteristic shared by all users in each subset; and
   communicating with the plurality of users by propagating a communication to the first user group or the second user group.

13. The non-transitory computer readable medium of claim 12, wherein the user profile of the user comprises characteristics collected from the user.

14. The non-transitory computer readable medium of claim 12, said method further comprising:
   responsive to propagating the communication to the first user group or the second user group, receiving feedback data from members of the first user group or the second user group;
   processing the feedback data into a set of aggregate statistics; and
   updating the aggregate statistics responsive to receiving additional feedback data from additional members of the first user group or the second user group.

15. A computing system, comprising a processor, a memory, and a non-transitory computer readable medium storing instructions executable by the processor via the memory to implement a method for remotely exchanging data over a network, said method comprising:
   establishing a bi-directional connection between a user and a computing device, wherein the computing device is configured to transmit multimedia items to a plurality of users, the plurality of users comprising the user, the bi-directional connection configured to bidirectionally transmit operational data representing data associated with at least one of content, quality, and process of reproducing a multimedia item at the user;

establishing a one-way connection with the user, the one-way connection configured to transmit the multimedia item from the computing device to the user; and at the computing device, sending the multimedia item to the user through the one-way connection between the computing device and the user.

16. The computing system of claim 15, further comprising receiving a request for the multimedia item, the computing device establishing the bi-directional connection responsive to receiving the request.

17. The computing system of claim 15, wherein transmissions of the operational data over the bi-directional connection are initiated at a source of the operational data.

18. The computing system of claim 15, wherein the operational data comprises at least one of information describing a network connection quality associated with the user, client device information, and user interaction data.

19. The method of claim 1, wherein the plurality of users comprises a first user group, wherein the first user group comprises the user, wherein the one way connection is separate from the bi-directional connection, and wherein said sending the multimedia item to the user through the one-way connection is in response to said establishing a one-way connection.

20. The method of claim 19, wherein a first subset of the plurality of users is assigned to the first user group based on user profiles of the plurality of users, and wherein the users in the first subset of the plurality of users share at least one common characteristic.

* * * * *